United States Patent
Beesley et al.

(10) Patent No.: US 12,006,881 B2
(45) Date of Patent: Jun. 11, 2024

(54) METHOD OF CONTROLLING A COMBUSTOR

(71) Applicant: Siemens Energy Global GmbH & Co. KG, Munich (DE)

(72) Inventors: Brian Beesley, Lincoln (GB); Dorian Skipper, Lincoln (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/253,934

(22) PCT Filed: Nov. 26, 2021

(86) PCT No.: PCT/EP2021/083219
§ 371 (c)(1),
(2) Date: May 23, 2023

(87) PCT Pub. No.: WO2022/117464
PCT Pub. Date: Jun. 9, 2022

(65) Prior Publication Data
US 2024/0011444 A1    Jan. 11, 2024

(30) Foreign Application Priority Data

Dec. 1, 2020  (GB) ..................... 2018929

(51) Int. Cl.
*F02C 9/34*  (2006.01)
*F02C 7/228*  (2006.01)
(Continued)

(52) U.S. Cl.
CPC ............... *F02C 9/34* (2013.01); *F02C 7/228* (2013.01); *F02C 9/28* (2013.01); *F23R 3/343* (2013.01);
(Continued)

(58) Field of Classification Search
CPC ........ F23R 3/343; F05D 2270/31; F02C 9/34; F02C 7/228
See application file for complete search history.

(56) References Cited

U.S. PATENT DOCUMENTS 4,420,929 A * 12/1983 Jorgensen ............... F23R 3/346
60/737
2019/0101062 A1   4/2019 Vise et al.

FOREIGN PATENT DOCUMENTS

EP    2088288 A2   8/2009
EP    2486328 B1   7/2013
(Continued)

OTHER PUBLICATIONS

PCT International Search Report and Written Opinion of International Searching Authority dated Mar. 18, 2022 corresponding to PCT International Application No. PCT/EP2021/083219 filed Nov. 26, 2021.
(Continued)

*Primary Examiner* — Katheryn A Malatek

(57) ABSTRACT

A method of controlling a combustor of a gas turbine engine is disclosed. The method comprising the steps supplying a total fuel quantity to the combustor dependent on a load of the gas turbine engine, the total fuel quantity is split into a pilot fuel quantity and a main fuel quantity via a pilot fuel split, monitoring at least one signal of at least one condition of the gas turbine engine, generating a steady state value of the at least one signal indicative of a steady state of the gas turbine engine, detecting a change in the at least one signal from the steady-state value. When the change in the at least one signal from the steady state value exceeds a predetermined limit, the method applies the steps generating a transient split offset for the pilot fuel split from a look-up table and applying the transient split offset to the pilot fuel
(Continued)

split while maintaining the total fuel quantity being supplied at any point in time.

10 Claims, 3 Drawing Sheets

(51) Int. Cl.
F02C 9/28 (2006.01)
F23R 3/34 (2006.01)
(52) U.S. Cl.
CPC ...... *F05D 2270/08* (2013.01); *F05D 2270/31* (2013.01); *F23R 3/34* (2013.01)

(56) References Cited

FOREIGN PATENT DOCUMENTS

| | | |
|---|---|---|
| EP | 1974139 B1 | 8/2018 |
| JP | 2011111964 A | 6/2011 |
| JP | 2012077662 A | 4/2012 |
| WO | 2007082608 A1 | 7/2007 |
| WO | 2011042037 A1 | 4/2011 |

OTHER PUBLICATIONS

GB Application No. 2018929.6 filed on Dec. 1, 2020, Search Report dated May 28, 2021.

\* cited by examiner

METHOD OF CONTROLLING A COMBUSTOR

FIELD OF INVENTION

The present invention relates to a method of controlling a combustion system of a gas turbine engine and in particular a method of controlling the combustion system to improve reliability and/or reduce emissions during transient conditions of the gas turbine engine.

BACKGROUND OF INVENTION

In a gas turbine engine, fuel is introduced within the combustion chamber from multiple injection points using multiple fuel supply lines. Normally, the fuel will be fed through different fuel supply lines for primary or pilot fuel and main fuel. Within the combustion chamber a pilot flame and a main flame are distinct although interact as is well known to provide flame stability. The main flame has a relatively high air to fuel ratio and is a lean burn flame giving good efficiency and low emissions. The pilot flame has a lower air to. Fuel ratio and burns in a richer flame. The pilot flame is more stable than the main flame and helps to stabilise the main flame. The split or ratio of the total fuel into pilot and main fuels is controlled by the Engine Control Unit via a number of controllable valves. The quantity of the total fuel supplied to each of the pilot and main fuel injector k scheduled dependent on gas turbine engine load.

Although the total quantity of fuel is split into a pilot fuel quantity and a main fuel quantity and which has a pilot to main fuel split; usually the fuel split is referred to as a pilot fuel split, which is the split or percentage of pilot fuel quantity to total fuel quantity. In general, at higher engine loads proportionally more fuel is supplied to the main fuel injectors, resulting in a low pilot fuel split, and at lower engine loads proportionally more fuel k supplied to the pilot fuel injectors, resulting in a high pilot fuel split. Conventionally, the pilot fuel split is scheduled dependent on the gas turbine engine's load.

Changes in engine load, calorific values of fuel and ambient conditions can give rise to combustion instability. This combustion instability can cause increased harmful emissions, increased temperature of components, pressure fluctuations that are detrimental to structural integrity and flame blow-out. These are all clearly undesirable effects of combustion instability.

EP1974139131 discloses an active modulation of the pilot fuel split and is designed to adapt to variations in conditions experienced during steady state operation i.e. constant load demand. Such variations in conditions comprise ambient temperature, manufacturing tolerances and specific site demands. However, this active modulation is set at conservative levels with respect to limiting emissions to ensure full operability, particularly managing combustion instability, of the combustor. The method of EP1974139B1 is termed active pilot herein.

EP2486328B1 discloses a control arrangement that is arranged to vary the split of main and pilot fuel supplies, i.e. via controlling the pilot fuel split, to a combustor via a signal based on temperature and pressure of the combustor 16 and on progress over time. The control arrangement is further configured such that the signal also represents a load information being indicative of a load of the combustion apparatus. The control arrangement is intended to maintain the temperature of the combustor below a predetermined maximum temperature limit and to keep the pressure variations within the combustion volume below a predetermined maximum pressure variation limit, while keeping the overall fuel supply in the fuel supply line to the apparatus substantially constant. The control arrangement of EP2486328B1 is termed as Intelligent control.

The methods of controlling fuel splits disclosed in EP1974139B1 and EP2486328B1, alone or in combination, provide good combustion operability and low emissions at steady state conditions. However, there is a constant desire to further improve combustion operability, reliability and reduce emissions even further.

SUMMARY OF INVENTION

The present invention has at least the following objectives, particularly during transient engine conditions, to reduce combustion instability and potential for flame failure events during transient load changes and during recovery from these transient events. Furthermore, the present invention reduces the potential for detrimental effect on emissions in steady state operation for period following transient events due to combustion instability this may cause with the present invention.

The above objects are achieved by a method of controlling a combustor of a gas turbine engine, the method comprising the steps supplying a total fuel quantity to the combustor dependent on a load of the gas turbine engine, the total fuel quantity is split into a pilot. Fuel quantity and a main fuel quantity via a pilot fuel split, the pilot fuel split is the percentage of the pilot fuel quantity to the total fuel quantity, monitoring at least one signal of at least one condition of the gas turbine engine and generating a steady state value of the at least one signal indicative of a steady state of the gas turbine engine. The method comprises the further steps detecting a change in the at least one signal from the steady-state value, when the change in the at least one signal from the steady state value exceeds a predetermined limit, generating a transient split offset for the pilot fuel split from a look-up table and applying the transient split offset to the pilot fuel split while maintaining the total fuel quantity being supplied at any point in time.

The step the at least one condition of the gas turbine engine is such that it may be indicative of the state of the air/fuel ratio in the combustor and in particular, a change in the air/fuel ratio. The at least one condition may be any one or more of the group: a position of a variable guide vane, a position of a blow-off valve, a position of a bleed valve, a fuel energy input rate, a rotational speed demand of the engine and a load demand value.

The pilot fuel split may be either a scheduled pilot fuel split or a scheduled pilot fuel split with a steady state active pilot fuel split applied.

The method comprises the further steps monitoring combustion instability, monitoring a temperature of the combustor, and applying a steady state active pilot split offset to adjust the scheduled pilot fuel split when a predetermined temperature of the combustor is exceeded and/or a predetermined value of combustion instability is exceeded to create a steady state pilot fuel split.

The step generating a steady state value of the at least one signal indicative of a steady state of the gas turbine engine may comprise feeding the at least one signal into a low-pass filter having a time constant of at least 1 seconds and preferably less than 10 second, preferably in the range 5-7 seconds.

The method may comprise the steps selecting the greatest of all the transient split offsets generated and applying the transient split offset to the pilot fuel split uses the greatest of all the transient split offsets generated.

The step applying the transient pilot split off-set to the steady state pilot fuel split may comprises instantaneously increasing the pilot fuel split.

When the change in the at least one signal from the steady state value reduces from its peak value, the method gradually reduces the transient pilot split off-set, reducing to zero if the split offset required falls to zero.

The step gradually reducing the transient pilot split off-set may comprise a maximum reduction rate with a first maximum rate of reducing and a second maximum rate of reducing, the first rate of reducing is greater than the second rate of reducing the transient active pilot split offset.

The look-up table may comprise a series of transient fuel split values for each engine condition. There may be a look-up table for each transient fuel split values for each condition of the engine. The series of transient fuel split values may be based on the condition of the gas turbine engine and may either linear or non-linear. The series of transient fuel split values may be linearly interpolated between transient fuel split values.

The series of transient fuel split values for each engine condition may have a maximum value which is not exceeded.

BRIEF DESCRIPTION OF THE DRAWINGS

The above-mentioned attributes and other features and advantages of the present technique and the manner of attaining them will become more apparent and the presently disclosed combustor and method of operation will be better understood by reference to the following description of embodiments of the present technique taken in conjunction with the accompanying drawings, wherein.

DETAILED DESCRIPTION OF INVENTION

Figure 1:
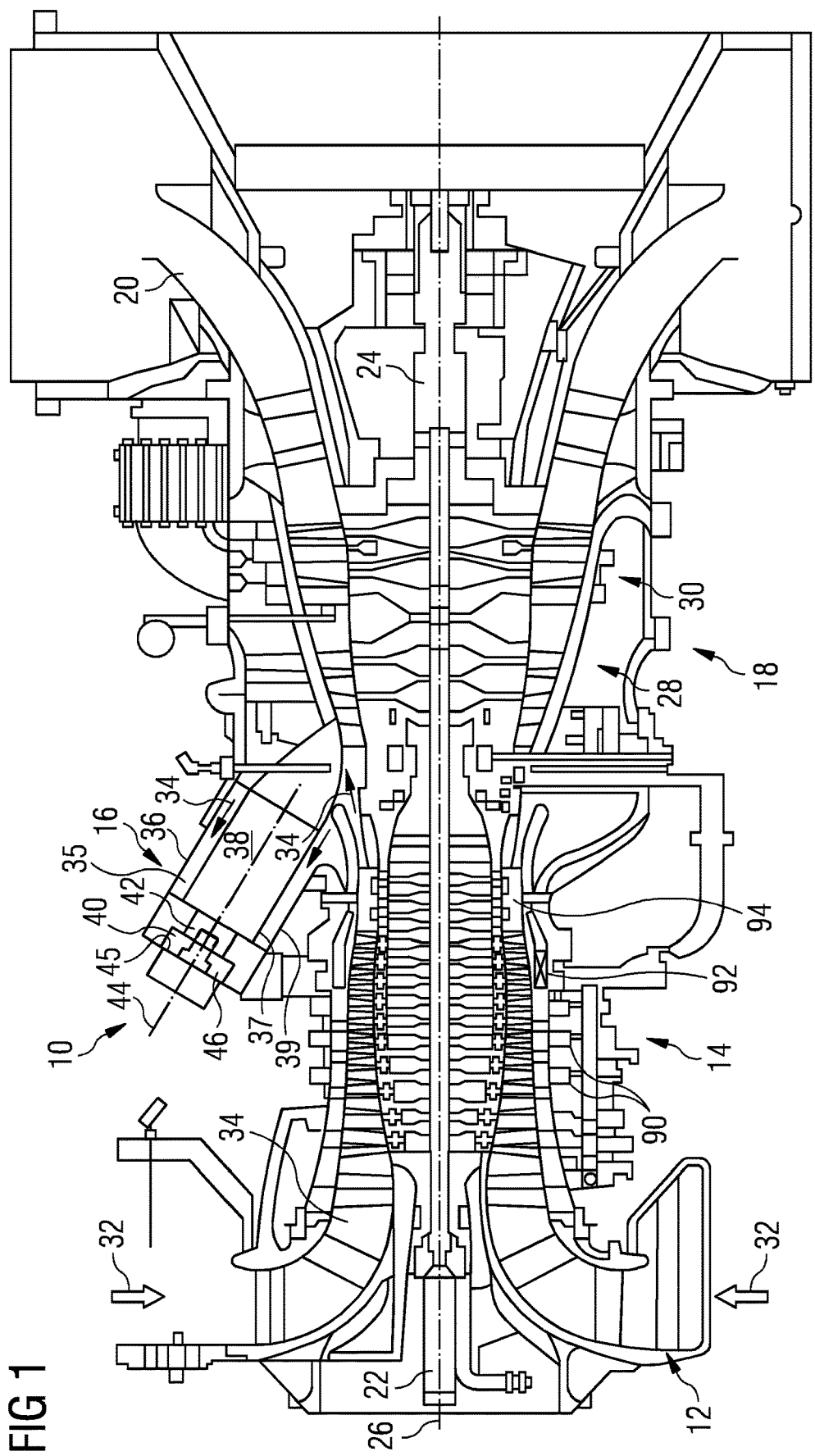
FIG. 1 shows part of a turbine engine in a sectional view and in which the present combustion system is incorporated and in accordance with the present disclosure.

FIG. 1 is a schematic and sectional illustration of a general arrangement of a turbine engine 10 having an inlet 12, a compressor 14, a combustor system 16, a turbine system 18, an exhaust duct 20 and a twin-shaft arrangement 22, 24. The turbine engine 10 is generally arranged about an axis 26 which for rotating components is their rotational axis. The shafts of the twin-shaft arrangement 22, 24 may have the same or opposite directions of rotation. The combustor system 16 comprises an annular array of combustors or combustor cans 36, only one of which is shown. In one example, there are six combustors 36 evenly spaced about the engine 10. The turbine system 18 includes a high-pressure turbine 28 drivingly connected to the compressor 14 by a first shaft 22 of the twin-shaft arrangement. The turbine system 18 also includes a low-pressure turbine 30 drivingly connected to a load (not shown) via the second shaft 24 of the twin-shaft arrangement.

The terms radial, circumferential and axial are with respect to the engine's rotational axis 26 or as otherwise stated for example with reference to a combustor axis 44. The terms upstream and downstream are with respect to the general direction of gas flow through the engine and, as seen in FIG. 1, is generally from left to right.

The compressor 14 comprises an axial series of stator vanes and rotor blades mounted in a conventional manner. The stator or compressor vanes may be fixed or have variable geometry to improve the airflow onto the downstream rotor or compressor blades as is well known. Each turbine 28, 30 comprises an axial series of stator vanes and rotor blades. The stator vanes can be mounted to a radially outer casing or a radially inner drum. The rotor blades are mounted via rotor discs arranged and operating in a conventional manner. A rotor assembly comprises an annular array of rotor blades or blades and the rotor disc.

Each combustor 36 is constructed from two walls, an inner wall 37 and an outer wall 39, between which is defined a generally annular space or plenum 35. At the head of the combustor 36 is a radial swirler 40 which comprises a swirl plate or base plate 45, an annular array of swirler vanes 46 and fuel injection points as will be described in more detail later. The swirler 40 is succeeded by a pre-chamber 42 and then a main combustion chamber 38. These combustor 36 components are generally arranged about the combustor axis 44. The annular array of swirler vanes 46 define swirler slots 47, arranged around the base plate 45.

In operation, air 32 is drawn into the engine 10 through the inlet 12 and into the compressor 14 where the successive stages of vanes and blades compress the air before delivering the compressed air 34 into the combustor system 16. The compressed air 34 flows through the plenum 35 and into the swirler 40. The swirler 40 creates highly turbulent air into which the fuel is injected. The air fuel mixture is delivered into the pre-chamber 42, where mixing continues, and then into the main combustion chamber 38. In the combustion chamber 38 the mixture of compressed air and fuel is ignited and burnt. The resultant hot working gas flow is directed into, expands and drives the high-pressure turbine 28 which in turn drives the compressor 14 via the first shaft 22. After passing through the high-pressure turbine 28, the hot working gas flow is directed into the low-pressure turbine which drives the load via the second shaft 24.

The low-pressure turbine 30 can also be referred to as a power turbine and the second shaft 24 can also be referred to as a power shaft. The load is typically an electrical machine for generating electricity or a mechanical machine such as a pump or a process compressor. Other known loads may be driven via the low-pressure turbine. The fuel may be in gaseous and/or liquid form.

The turbine engine 10 shown and described with reference to FIG. 1 is just one example of a number of engines or turbomachinery in which this invention can be incorporated. Such engines can be gas turbines or steam turbine and include single, double and triple shaft engines applied in marine, industrial and aerospace sectors.

Figure 2:
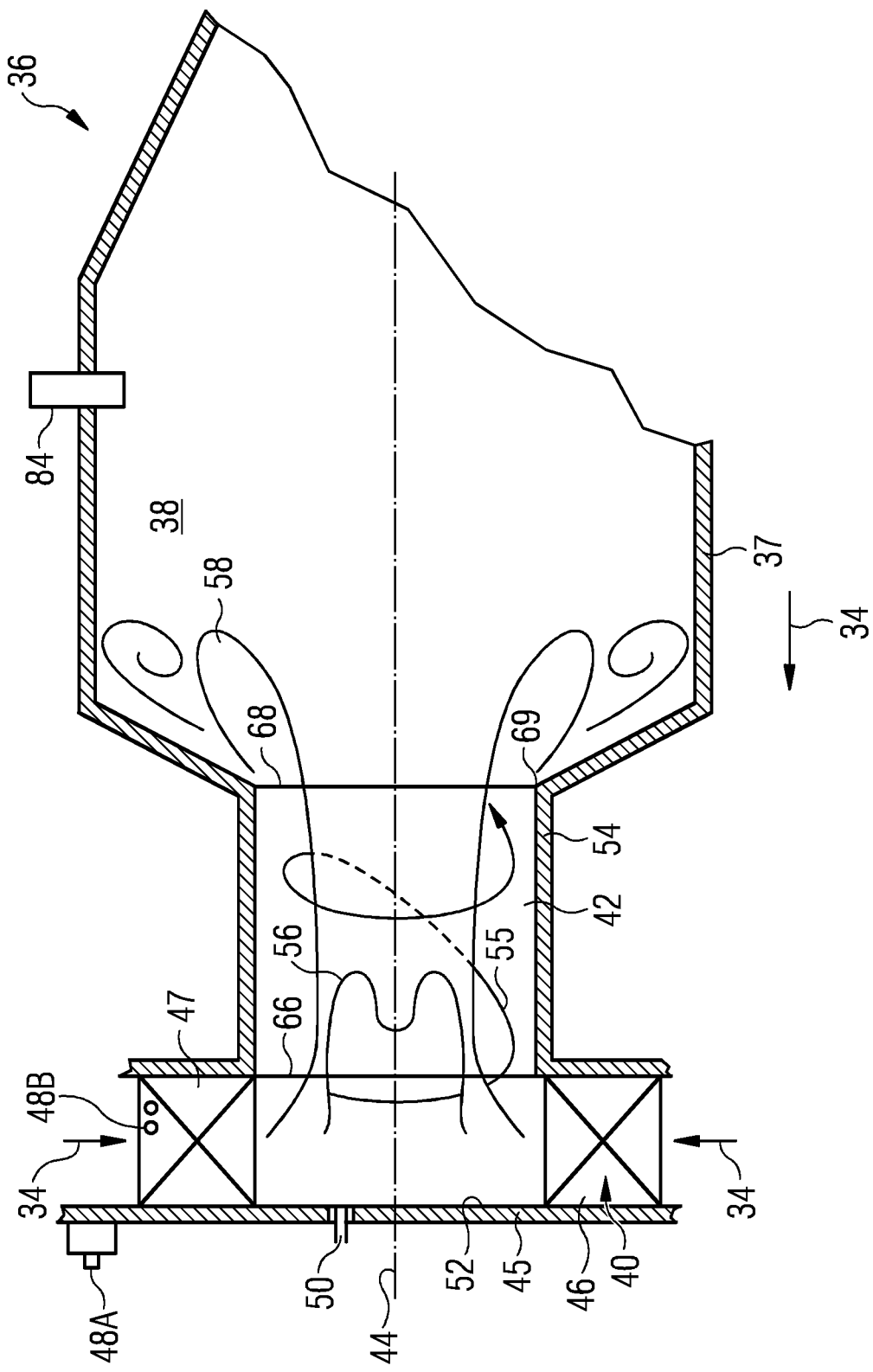
FIG. 2 is a schematic section through a combustor of the combustion system of the gas turbine and is in accordance with the present invention.

FIG. 2 is a cross-section through part of one combustor 36 of a group of combustors of the turbine engine 10 described above and in accordance with the present invention. The radial swirler 40 comprises the annular array of vanes 46, arranged about the combustor axis 44, and which are angled tangentially relative to the combustor axis 44 to impart a swirling flow of mixing air and fuel as is well known. The swirling flow 55 rotates about the combustor axis 44 and flows in a general left to right direction as seen in FIG. 2, The swirler vanes 46 form an array of mixing channels or swirler slots 47 between each consecutive swirler vane 46. The swirler 40 further comprises main fuel injectors 48A, 48B for injecting a main fuel and pilot fuel injectors 50 for injecting a pilot fuel. The swirler 40 comprises the base plate which has a pilot surface 52 that faces the pre-chamber 42 and bounds the pre-chamber's upstream axial extent. The pre-chamber 42 is further defined by an annular wall 54 arranged symmetrically about the combustor axis 44. The pre-chamber 42 has an inlet 66 and an outlet 68. The outlet 68 forms or is at a lip 69 of the pre-chamber 42 and defines where the pre-chamber 42 terminates. The pre-chamber's 42 annular wall 54 is then succeeded by the generally annular wall 37 of the main combustion chamber 38. From the lip 69 and downstream the generally annular wall 37 is divergent and opens to define the main combustion chamber 38. The main combustion chamber 38 has a greater cross-sectional area than that of the pre-chamber 42.

There are two distinct fuel/air mixtures and subsequently combustion flames in the combustion chamber 38; a pilot flame 56 is derived from the pilot fuel/air mixture and the main flame 58 is derived from the main. Fuel/air mixture. The lines indicated 56 and 58 show the flame front and the respective flames continue downstream of the flame front. The pilot flame 56 and the main flame 58 are distinct from one another because of the location of the respective fuel injection points within the air flow 34 in or near to the mixing channel(s) 47. The main fuel injectors 48A, 48B inject main fuel into the swirler slot or mixing channel 47 further away from, i.e. radially outwardly of, the combustor axis 44 than the pilot fuel injector(s) 50. Thus, the respective fuel/air mixtures form substantially different flame regions with the pilot flame 56 generally radially inward of the main flame 58. In this example, the pilot fuel injector(s) 50 is located through the base plate 45 and which is radially inwardly of the swirler 40.

Radial swirlers, as in the case here, have or can be defined as having, a swirl number SN. The radial swirler 40 described above has a SN in the region 0.5 to 0.8. The swirl number can be calculated as is well known in the art, suffice to say here, that the swirl number can be defined by a relationship between the fluxes of angular and linear momentum of the fuel/air mixture. That is to say, the angular momentum relates to rotational velocity about the combustor axis 44 and the linear momentum relates to the velocity in the axial direction along the combustor axis 44, Thus, the SN is defined herein as the ratio of tangential momentum to axial momentum of the fluid or fuel/air mixture.

Figure 3:
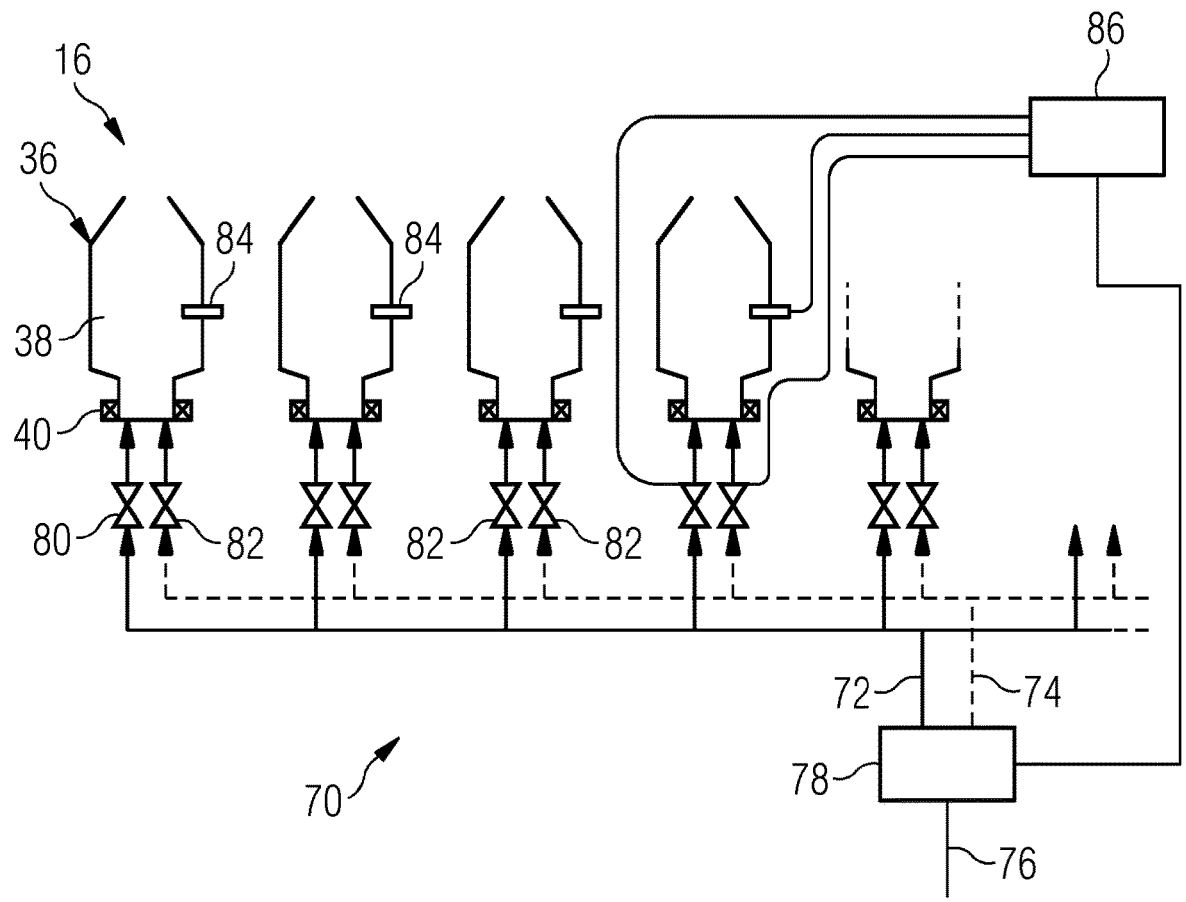
FIG. 3 is a schematic illustration of a fuel supply system for the combustion system of the gas turbine, including a controller which is programmed to control the combustor(s) in accordance with the present invention.

FIG. 3 is a schematic illustration of a fuel supply arrangement 70 for supplying fuel to the combustors of the combustion system. The fuel supply arrangement 70 comprises a main fuel supply 72, a pilot fuel supply 74, a total fuel supply 76, a main fuel valve 80, a pilot fuel valve 82, a combustion monitor 84 and a controller 86. The controller 86 is part of the engine's electronic control unit (ECU), but it may be a separate component. The controller 86 comprises software programming which is a part of the overall engine control software. The controller 85 is connected to the main fuel valve 80, the pilot fuel valve 82 and the combustion monitor 84 of each combustor 36. The combustion monitor 84 measures combustion instability via dynamic pressure fluctuations. As mentioned, the combustion system 16 has a number of combustors 36, in this case there are 6 combustors 36 spaced evenly around the engine's axis 26. Each combustor 36 has its own main fuel supply 70 controlled by the main fuel valve 80 and pilot fuel supply 72 controlled by the pilot fuel valve 82 and each main and pilot fuel valve 80, 82 is connected to the controller 86 and is controllable by the controller 86, Each combustor 35 has at least one combustion monitor 84 and which are each connected to the controller 36.

The controller 85 is connected to, monitors, and controls a position of the variable guide vanes, a position of a blow-off valve(s) and a position of a bleed valve(s). The position of the variable guide vanes, the position of the blow-off valve(s) and the position of the bleed valve(s) are continuously monitored by the controller 86. The position of the variable guide vanes, the position of the blow-off valve(s) and the position of the bleed valve(s) are scheduled dependent on the condition of the engine and are generally conventionally operated. The controller 86 is connected to and monitors the rotational speed of the engine and the load demand value on a continual basis. All these parameters are indicative of transient engine condition and a change in the air fuel ratio in the combustor which can lead to combustion instability.

During operation of the combustion system 16 the combustion monitor 84 monitors the pressure fluctuations in the combustion chamber 38 and transmits a reading of the pressure fluctuations to the controller 86. The combustion monitor 84 continuously transmit to the controller 86.

On engine start-up, fuel is supplied to the pilot injectors 50 in one or more of the combustors 36 and the fuel is ignited. The pilot fuel valve 82 is open. The main fuel valve is closed. When the pilot flame 56 is established in any one of the combustors 36, and there is a demand to increase engine power, fuel is then supplied to the main injectors 48A, 48B and the main fuel valve 80 is opened an amount representative of the demanded power output. When the main flame 58 is established in each combustor 36 the controller 86 determines the status of combustion stability in each combustor 36 and the combustion stability<a predetermined value, the pilot fuel valve 82 for that combustor 36 begins to close and reduce the pilot fuel supply. The total fuel supply 76 remains constant or has negligible change, therefore what would have been the pilot fuel supply quantity is now directed into the main fuel supply and is injected through the main fuel injectors 48A, 48B. Thus, at a constant demanded output of either the combustion system 16 or the gas turbine engine 10, the total fuel supplied and burned in the combustion chamber 38 also remains constant or very close to constant when the pilot fuel supply 72 is decreased to zero, Each combustion monitor 84 monitors the pressure fluctuations in each combustion chamber 38 and transmits a reading to the controller 86. Alternatively, the combustion monitor 84 monitors the pressure fluctuations (combustor stability) in the plenum 35, immediately external to the combustion chamber 38. The controller 86 is programmed to adjust the pilot fuel supply 74, by opening or closing the pilot fuel valves 82, partly dependent on the pressure fluctuations for each combustor 36. Here, any one or more of the combustors 36 may have its pilot fuel valve 82 closed or open depending on its combustion instability. Therefore, any one or more of the combustors 36 may be operating solely on its main fuel supply and a main flame 58 and other combustors 36 may be operating with a pilot fuel supply 72 and a main fuel supply with corresponding pilot and main flames 56, 58 present. However, it is possible that a group of combustors 36 or all of the combustors 36 may have the pilot fuel supply 72 closed or open depending on any one or more of the combustors' combustion stability. For example, when the pilot fuel valves are closed on all of the group of combustors 36 and a combustion instability threshold or value is reached, all of the group's pilot fuel valves 82 are opened.

The steady state condition of the gas turbine engine is where the demanded load is substantially constant for a period of time such that there is a substantially constant total fuel supply to the combustor. A transient state condition of the gas turbine engine occurs when the demanded power output or load changes, for example by at least 1% of the engine's maximum power output or load, and the total fuel supplied to the combustor changes accordingly.

Although the present method of controlling the combustor and the fuel flow to the combustor is described as an 'add-on' to the active pilot control of EP1974139B1 and/or the intelligent control of EP248632881, it is not essential that either of these known methods is already applied and other control systems may be in use to which the present method may be applied. As mentioned in the preamble, the existing active pilot control, as disclosed in EP197413981 and as particularly as described with reference to FIG. 6 therein, is a steady state offset or trim on the schedule of pilot fuel splits. The schedule of pilot fuel splits is dependent on the engine load. The existing active pilot control is designed to cater for variations in ambient or site conditions or manufacturing tolerances. The active pilot control does not sufficiently control the pilot/main fuel flows during load transients. The active pilot control uses the temperature of the combustor, but because the temperature is not stable it could even be adjusting the wrong pilot/main fuel split due to a lag in temperature response to a change in load. This lag means it takes longer for the pilot/main fuel split to recover to where it should be during steady state conditions after the load transient and leading to increased emissions for longer. In combination with the active pilot control, as disclosed in EP197413981, the intelligent control arrangement of EP248632881, as particularly as described with reference to FIGS. 6A and 6B therein, may be operational such that the intelligent control arrangement varies the fuel supplied, i.e. the pilot fuel split, to a combustor via a signal based on temperature and pressure of the combustor and on progress over time. The control arrangement is further configured such that the signal also represents a load information being indicative of a load of the combustion apparatus. The intelligent control arrangement is intended to maintain the temperature of the combustor below a predetermined maximum temperature limit and to keep the pressure variations within the combustion volume below a predetermined maximum pressure variation limit, while keeping the total fuel supply in the fuel supply line to the apparatus substantially constant. The offset applied to the pilot fuel split in EP248632881 is herein referred to as the 'intelligent control offset'. Both the steady state active pilot split offset control of EP197413981 and the intelligent control offset of EP248632881 are herein referred to as the 'steady state active pilot split offset'. Thus, the steady state active pilot split offset may be the active pilot offset and/or the intelligent control offset as applied to the pilot fuel split.

The present method applies a transient split offset to the pilot fuel split with or without the intelligent control offset or the steady state active pilot split offset as described above. The transient split offset is applied instantly and is proactive in preventing combustion instability. In particular, the present method of controlling the combustor applies the transient split offset to the methods disclosed in EP1974139B1 and in EP2486328B1 and which the disclosures are incorporated by reference herein.

Figure 4:
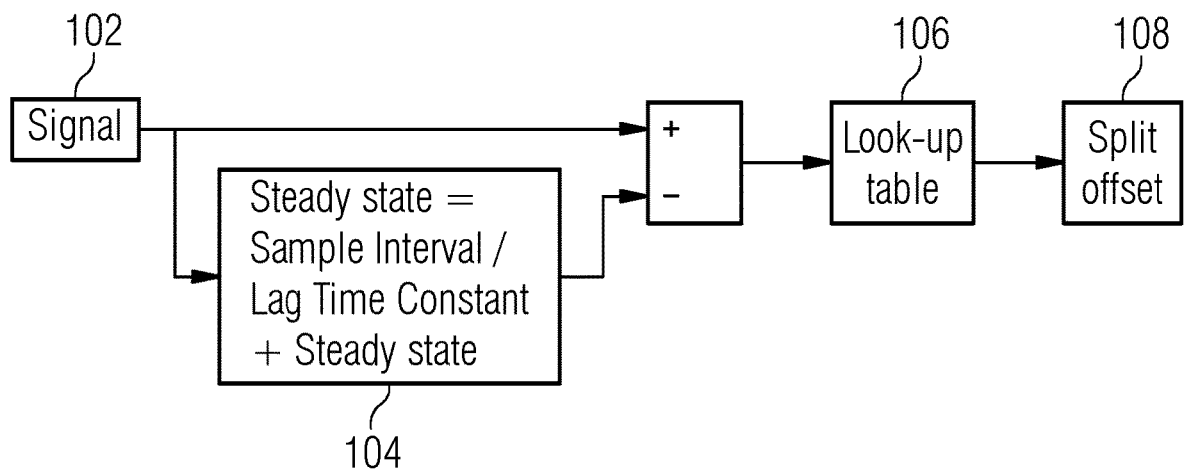
FIG. 4 is a flow diagram showing the method of controlling the combustor(s) of the gas turbine engine and is in accordance with the present invention.

Referring now to FIG. 4 which shows a flow diagram of the method of controlling the combustor 100 in accordance with the present invention. The transient split offset is based on a number of different signals 410 relating to a condition of the engine, particularly indicative of a transient engine condition, which can lead to an increase in the air to fuel ratio in the combustor 16. An increase in the air to fuel ratio can lead to undesirable combustion instability. The application of the transient split offset to the pilot fuel split maintains stable combustion during transient engine conditions. Transient engine conditions are often as a result of changes in demanded output or load and are the phase between a first demanded output, e.g. 90% maximum output, and a second demanded output, e.g. 50% maximum output, and can even continue after the engine has reached the second demanded output until combustion has stabilized. Maintenance of stable combustion reduces the potential for flame failure and high vibration levels due to the instability during the transient engine condition and subsequent recovery from combustion instability.

The signals 102 from the engine are monitored continuously and are relayed to the engine control unit 86 for processing. The condition of the gas turbine engine that influences the air to fuel ratio in the combustor is any one or more of the group a position of a variable guide vane 90, a position of a blow-off valve 92, a position of a bleed valve 94, a fuel energy input rate (otherwise referred to as total fuel demand), a rotational speed demand of the engine or a load demand value. In a preferred embodiment, the control unit 86 is programmed with schedules of demanded positions of the variable guide vane 90, the position of the blow-off valve 92, the position of a bleed valve 94 and the demanded fuel energy input rate, the demanded rotational speed and the load demand value. In another embodiment, the physical positions of the variable guide vanes 90, blow-off valve 92 and bleed valve 94 may be used. However, using the demanded positions provides earlier intervention by the transient pilot offset than using a feedback from the monitored positions.

The present method of controlling the combustor generates a steady state value of at least one signal 102 of the condition(s) listed above and which signal 102 or signals 102 are indicative of the steady state of the engine. The steady state of the engine can be when the combustor is operating with a scheduled pilot fuel split or when a steady state active pilot split offset is applied to the scheduled pilot fuel split. Generating the steady state value of the signal comprises feeding the signal into a low-pass or lag filter 104 having a time constant of at least 1 seconds and preferably less than 10 seconds. In most cases, the time constant is in the range 5-7 seconds. The time constant for any particular gas turbine engine may be determined empirically as a result of passing-off tests and/or in-service activity.

A steady state filter with a smaller time constant than the lag filter 104, for example a lag of up to 1 second, may be applied to the total fuel demand, i.e. in the step supplying a total fuel quantity to the combustor dependent on a load of the gas turbine engine, before calculating the change of the output of this filter from the steady state filter output. This smaller lag filter aims to reduce the potential for speed 'noise' or fluctuations due to small instabilities from causing a split offset to be applied when the engine is operating a fixed speed or load, especially in steady state operation.

The engine control unit 86 is continuously monitoring the signals 102 of the engine conditions and detects a change in the at least one signal 102 from the steady-state value. When the change in the at least one signal 102 from the steady state value exceeds a predetermined limit the engine control unit 68 generates a transient split offset 108 for the pilot fuel split from a look-up table 106. There is a separate look-up table 106 for each of the engine conditions. The engine control unit 86 then applies the transient split offset 108 to the pilot fuel split while maintaining the total fuel quantity being supplied at any point in time. The transient split offset is applied to the total fuel supply as it is split into pilot and main fuel supplies going to all the combustor units of the gas turbine engine.

As mentioned, the pilot fuel split is either a scheduled pilot fuel split or a scheduled pilot fuel split with a steady state active pilot fuel split offset applied. When the transient split offset is generated it is applied in addition to the scheduled pilot fuel split or in addition to the scheduled pilot fuel split with the steady state active pilot fuel split offset applied. Thus, the transient split offset plus the steady state active pilot fuel split offset result in a total split offset. Of course, the total split offset can be the transient split offset alone.

The method of controlling the combustor may also comprise monitoring combustion instability, monitoring a temperature of the combustor, and applying a steady state active pilot split offset to adjust the scheduled pilot fuel split when a predetermined temperature of the combustor is exceeded and/or a predetermined value of combustion instability is exceeded to create a steady state pilot fuel split. This aspect, as already discussed is what is known from EP1974139B1 and EP248632881.

The method of controlling the combustor comprises the step of selecting the greatest of all the transient split offsets that are generated from the signals of the conditions of the gas turbine engine as discussed above. The greatest transient split offset is then applied to the pilot fuel split with or without the steady state active pilot split offset. Applying the transient pilot split offset comprises instantaneously increasing the pilot fuel split.

As the difference between input 102 and steady state signal 104 reduces the split offset 108 generated from look-up table 106 reduces. To prevent offset 108 from reducing too quickly and causing combustion instability from insufficient pilot split during the recovery from the transient event, the maximum rate at which the transient pilot split offset can reduce is limited. Once the transient pilot split offset is zero, the pilot fuel split is either that which has been scheduled or the scheduled pilot fuel split plus the steady state active pilot split offset. The gradual reduction of this rate limit allows the combustion flame to stabilise. Further, in gradually reducing the transient pilot split off-set to zero the reduction may be at a relative rapid first rate and then at a relatively slower second rate. This is advantageous as the reduction in the transient split offset at first quickly limits the size or quantity of the pilot flame, thereby limiting emissions, before a slower ramp off to the steady state pilot fuel split to prevent any sudden changes in combustion behaviour.

The look-up table 105 comprises a series of transient fuel split values for each engine condition, and the series of transient fuel split values is based on the condition of the gas turbine engine and is either linear or non-linear. The series of transient fuel split values may be linearly interpolated between transient fuel split points or values. For example, the angular position of variable stator vanes in the compressor may have the series of transient fuel split values associated to angular values of 5°, 10°, 15°, 20° etcetera. Where the actual angular position of the variable stator vanes is, say 12°, the transient fuel split value will be 40% (2° in 5° between respective points) of the difference between values at 10° and 15° from the 10° value. The series of transient fuel split values for each engine condition may have a maximum limit applied that may be the lower of a fixed maximum offset and a value determined by the difference between a fixed maximum permitted pilot split with total split offset applied and the current schedule pilot split with or without steady state active pilot split offset applied. This is to prevent the transient split offset from causing an excessively high pilot split that has little or no benefit and could in some cases lead to long term engine component degradation due to high flame temperatures that excessively high pilot split values could cause.

Application of the transient split offset or put another way its intervention, maintains stable combustion on increasing load, particularly where bleed-to-inlet is fitted or for variable guide vane modulation where there is no offset applied to the scheduled pilot fuel split to prevent unstable combustion during load transients. A bleed-to-inlet system involves ducting between the compressor and the engine's inlet to duct compressed air to the engine's inlet to heat the inlet air at very low ambient temperatures or to allow combustion temperature to be raised and emissions thereby reduced at lower engine loads.

Application of the transient split offset or put another way its intervention, maintains stable combustion on decreasing load, as the steady state pilot split schedules naturally lag behind engine response resulting in lower pilot split at any load than would normally be required for steady state operation. It also takes time for emissions controls to raise temperature to compensate as load reduces to reduce the air to fuel ratio to help keep combustion stable.

The transient split offset is responsive in a proactive manner to prevent potential combustion instability and as such may act on what the operator is demanding the engine to do or how the combustor or engine behaves rather than reactively responding to combustion instability. Thus, the present method of controlling to combustor using the transient split offset is much quicker to respond to improve reliability of the combustor compared to any known method and reduce steady state emissions for a period following a transient event due to reliance on the steady state active pilot to control combustion instability during transient events without this transient split offset.

Another advantage present method of controlling to combustor using the transient split offset is that the total change in the signals 102 from the steady state value is taken over a time period rather than reacting to a rate of change at any instant in time. This gives an improved response to slower changes in the signal. For example, the closing rate of the blow-off valves, can be relatively slow and below a 'rate of change' threshold, but such that the present time-period change can be detected. This means the present method has less susceptibility to noise while allowing better tuning of the total split offset for smaller and slower load change events.

Importantly, one main improvement the present method gives is engine reliability during transient events that significantly affect the fuel to air ratio within the engine without adversely affecting steady state operation. This is particularly important during wide load ranges where the engine emissions are maintained with the assistance of bleed systems and/or variable guide vane modulation (referred to as turndown range), especially where less than 15 parts per million NOx emissions are required.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling a combustor of a gas turbine engine, the combustor being supplied a total fuel quantity dependent on a load of the gas turbine engine, the total fuel quantity is split into a pilot fuel quantity and a main fuel quantity via a pilot fuel split, the pilot fuel split is a percentage of the pilot fuel quantity to the total fuel quantity, wherein the method comprises:
    monitoring at least one signal of at least one condition of the gas turbine engine,
    generating a steady state value of the at least one signal, wherein the steady state value of the at least one signal is indicative of a steady state of the gas turbine engine,
    detecting a change in the steady state value, the detecting occurring when the change in the value exceeds a predetermined limit,
    generating transient pilot split offsets for the pilot fuel split from a look-up table, and
    applying a transient pilot split offset from the generated transient pilot split offsets to the pilot fuel split while maintaining the total fuel quantity being supplied at any point in time,
    wherein, when the change in the steady state value comprises a reduction from a peak value the transient pilot split offset is gradually reduced to a zero value,
    wherein the gradually reducing of the transient pilot split offset comprises a maximum reduction rate with a first maximum rate of reducing and a second maximum rate of reducing, wherein the first maximum rate of reducing is greater than the second maximum rate of reducing the transient pilot split offset.

2. The method of controlling the combustor as claimed in claim 1, wherein the at least one condition of the gas turbine engine is indicative of the state of the air/fuel ratio in the combustor, wherein the at least one condition comprises one or more of the following:
    a position of a variable guide vane,
    a position of a blow-off valve,
    a position of a bleed valve,
    a fuel energy input rate,
    a rotational speed demand of the engine,
    a load demand value.

3. The method of controlling the combustor as claimed in claim 1, wherein the pilot fuel split is either a scheduled pilot fuel split or a scheduled pilot fuel split with a steady state active pilot fuel split applied.

4. The method of controlling the combustor as claimed in claim 3, wherein the method further comprises the steps of:
    monitoring combustion instability,
    monitoring a temperature of the combustor, and
    applying a steady state active pilot split offset to adjust the scheduled pilot fuel split when a predetermined temperature of the combustor is exceeded and/or a predetermined value of combustion instability is exceeded to create a steady state pilot fuel split.

5. The method of controlling the combustor as claimed in claim 1, wherein the step of applying the transient pilot split offset to the steady state pilot fuel split comprises instantaneously increasing the pilot fuel split.

6. The method of controlling the combustor as claimed in claim 1, wherein the look-up table comprises a series of transient fuel split values for multiple engine conditions, the series of transient fuel split values is based on the at least one condition of the gas turbine engine and is either linear or non-linear.

7. The method of controlling the combustor as claimed in claim 6, wherein the series of transient fuel split values for each of the multiple engine conditions has a maximum value which is not exceeded.

8. The method of controlling the combustor as claimed in 6, wherein the series of transient fuel split values is linearly interpolated between transient fuel split values.

9. The method of controlling the combustor as claimed in claim 1, wherein the generating of the steady state value indicative of the steady state of the gas turbine engine comprises feeding the at least one signal into a low-pass filter having a time constant from one of the following: at least 1 second; in a range from 1 second to 10 seconds; and in a range from 5 seconds to 7 seconds.

10. A method of controlling a combustor of a gas turbine engine, the combustor being supplied a total fuel quantity dependent on a load of the gas turbine engine, the total fuel quantity is split into a pilot fuel quantity and a main fuel quantity via a pilot fuel split, the pilot fuel split is a percentage of the pilot fuel quantity to the total fuel quantity, wherein the method comprises:
    monitoring at least one signal of at least one condition of the gas turbine engine,
    generating a steady state value of the at least one signal, wherein the steady state value of the at least one signal is indicative of a steady state of the gas turbine engine,
    detecting a change in the steady state value, the detecting occurring when the change in the steady state value exceeds a predetermined limit,
    generating transient pilot split offsets for the pilot fuel split from a look-up table,
    applying a transient pilot split offset from the generated transient pilot split offsets to the pilot fuel split while maintaining the total fuel quantity being supplied at any point in time,
    selecting a greatest transient pilot split offset from the generated transient pilot split offsets, and
    applying the greatest transient pilot split offset value to the pilot fuel split.

* * * * *